US012670748B2

(12) United States Patent
Seo et al.

(10) Patent No.: US 12,670,748 B2
(45) Date of Patent: Jun. 30, 2026

(54) APPARATUS FOR DRIVER ASSISTANCE AND METHOD OF CONTROLLING THE SAME

(71) Applicant: HL KLEMOVE CORP., Incheon (KR)

(72) Inventors: Junggon Seo, Gyeonggi-do (KR); Seungpyo Ha, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 278 days.

(21) Appl. No.: 18/208,242

(22) Filed: Jun. 9, 2023

(65) Prior Publication Data

US 2024/0062588 A1 Feb. 22, 2024

(30) Foreign Application Priority Data

Aug. 16, 2022 (KR) ........................ 10-2022-0102002

(51) Int. Cl.
*G07C 5/00* (2006.01)

(52) U.S. Cl.
CPC .................................... *G07C 5/008* (2013.01)

(58) Field of Classification Search
None
See application file for complete search history.

(56) References Cited

FOREIGN PATENT DOCUMENTS

| | | |
|---|---|---|
| JP | 2016-180720 | 10/2016 |
| JP | 2019-70558 | 5/2019 |
| JP | 2019-71530 | 5/2019 |
| JP | 2019070558 A * | 5/2019 |
| KR | 10-1553878 | 9/2015 |

OTHER PUBLICATIONS

Office Action dated May 30, 2025 for Korean Patent Application No. 10-2022-0102002 and its English translation provided by Applicant's foreign counsel.

* cited by examiner

*Primary Examiner* — Whitney Moore
(74) *Attorney, Agent, or Firm* — WOMBLE BOND DICKINSON (US) LLP

(57) ABSTRACT

Disclosed herein is an apparatus including a transmitter configured to transmit a signal through a transmission antenna, a receiver configured to receive a signal reflected from a target through a reception antenna and output the received signal as a digital signal, and a signal processor electrically connected to the transmitter and the receiver, wherein the signal processor generates a virtual antenna signal based on an original signal received from the receiver and suppress a side lobe of the original signal based on the virtual antenna signal.

12 Claims, 7 Drawing Sheets

| | | | | | | | | |
|---|---|---|---|---|---|---|---|---|
| Rx ANT | 0.0λ | 1.5λ | 2.5λ | 4.0λ | 6.0λ | 7.5λ | 8.5λ | 10.0λ |

| | | | | | | | | |
|---|---|---|---|---|---|---|---|---|
| Virtual ANT | 0.0λ | 0.5λ | 1.0λ | 1.5λ | 2.0λ | 2.5λ | 3λ | 3.5λ |
| Depth 0 | D0 | | | D0 | | D0 | | |
| Depth 1 | | | D1 | | D1 | | | D1 |
| Depth 2 | | D2 | | | | | D2 | |

APPARATUS FOR DRIVER ASSISTANCE AND METHOD OF CONTROLLING THE SAME

CROSS-REFERENCE TO RELATED APPLICATION

This application claims the benefit of Korean Patent Application No. 10-2022-0102002, filed on Aug. 16, 2022 in the Korean Intellectual Property Office, the disclosure of which is incorporated herein by reference.

BACKGROUND

1. Field

Embodiments of the present disclosure relate to an apparatus for receiving a signal through a reception antenna for a radar mounted on a vehicle, and a method of controlling the same.

2. Description of the Related Art

Generally, vehicles equipped with radar devices may estimate a distance between a host vehicle and a nearby object, a relative velocity and a direction of the nearby object, and the like through the radar devices and provide a driver assistance function such as an automatic emergency braking function, a smart cruise control function, or a highway traveling support function.

An array antenna, which has a structure in which a plurality of reception antennas are arranged to increase angular resolution, is used in the radar device. The array antenna forms one beam pattern in combinations of beams radiated from each antenna. At this time, a grating lobe having the same size as a main lobe may be generated due to an interval between antenna elements, and the grating lobe may result in an angle of arrival in a direction completely different from a direction of an actual target. In the case of the beam pattern, generally, a lobe positioned at about 0 degrees is referred to as a main lobe (hereinafter referred to as "a main lobe"), and the remaining parts are referred to as a side lobe (hereinafter referred to as "a side lobe"). A lobe having the same size as the main lobe among the remaining parts is present and is referred to as "a grating lobe." Ghost targets may be detected by the grating lobe, thereby adversely affecting the driver assistance functions.

Conventionally, among various antenna arrangement structures, an antenna array structure capable of resolving a grating lobe problem is selectively applied.

However, the conventional methods are methods of estimating and removing a position at which a grating lobe is positioned, there is a disadvantage in that even an actual target can be lost when the position of the grating lobe is incorrectly estimated or the grating lobe is removed regardless of a magnitude of a signal.

SUMMARY

Therefore, it is an aspect of the present disclosure to provide an apparatus capable of more effectively suppressing a side lobe of an antenna beam pattern.

Additional aspects of the disclosure will be set forth in part in the description which follows and, in part, will be obvious from the description, or may be learned by practice of the disclosure.

In accordance with one aspect of the present disclosure, an apparatus includes a transmitter configured to transmit a signal through transmission antenna, a receiver configured to receive a signal reflected from a target through a reception antenna and output the received signal as a digital signal, and a signal processor electrically connected to the transmitter and the receiver. The signal processor generates a virtual antenna signal based on an original signal received from the receiver and suppress a side lobe of the original signal based on the virtual antenna signal.

The signal processor may generate the virtual antenna signal in combinations of phase components of original signals received from the receiver.

The signal processor may generate the virtual antenna signal based on a virtual antenna including internal element antennas which are equidistant each other.

The reception antenna may be a physical reception antenna including internal element antennas which are non-equidistant each other. The virtual antenna may be a virtual reception antenna including the internal element antennas which are equidistant each other.

Array intervals of the internal element antennas of the virtual antenna may be equal intervals of 0.5λ or less.

The signal processor may perform digital beam forming (DBF) on the original signal received from the receiver and perform DBF on the virtual antenna signal.

The signal processor may suppress the side lobe of the original signal using a DBF result of the original signal and a DBF result of the virtual antenna signal.

The signal processor may include a virtual antenna generator configured to generate the virtual antenna signal based on the original signal received from the receiver, a digital beam former configured to form a first DBF signal by performing DBF on the original signal received from the receiver and form a second DBF signal by performing DBF on the virtual antenna signal generated by the virtual antenna generator, and a side lobe suppressor configured to suppress the side lobe of the original signal by synthesizing the first DBF signal and the second DBF signal.

The digital beam former may form the first DBF signal by applying phase modulation to the original signal and amplifying a signal in a specific direction and form the second DBF signal by applying phase modulation to the virtual antenna signal and amplifying a signal in a specific direction.

The side lobe suppressor may suppress the side lobe of the original signal by multiplying the first DBF signal by the second DBF signal.

The side lobe suppressor may suppress the side lobe of the original signal by multiplying the second DBF signal by a window coefficient for windowing processing and normalizing a multiplying result, and then multiplying the first DBF signal by a normalizing result.

In accordance with another aspect of the present disclosure, an apparatus includes a transmitter configured to transmit a signal through a transmission antenna, a receiver configured to receive a signal reflected from a target through a reception antenna and output the received signal as a digital signal, and a signal processor electrically connected to the transmitter and the receiver, wherein the signal processor includes a virtual antenna generator configured to generate a virtual antenna signal based on an original signal received from the receiver, a digital beam former configured to form a first digital beam forming (DBF) signal by performing DBF on the original signal received from the receiver and form a second DBF signal by performing DBF on the virtual antenna signal generated by the virtual antenna generator, and a side lobe suppressor configured to suppress a side lobe of the original signal by synthesizing the first DBF signal and the second DBF signal.

The side lobe suppressor may suppress the side lobe of the original signal by multiplying the second DBF signal by a window coefficient for windowing processing and normalizing a multiplying result, and then multiplying the first DBF signal by a normalizing result.

In accordance with still another aspect of the present disclosure, a method of controlling an apparatus for driver assistance includes transmitting, by a transmitter, a signal through a transmission antenna, receiving, by a receiver, receive a signal reflected from a target through a reception antenna, receiving, by a signal processor, an original signal from a receiver, generating a virtual antenna signal based on the received original signal, and suppressing a side lobe of the original signal based on the virtual antenna signal.

The generating of the virtual antenna signal may include generating the virtual antenna signal in combinations of phase components of original signals received from the receiver.

The generating of the virtual antenna signal may include generating the virtual antenna signal based on a virtual antenna including internal element antennas which are equidistant each other.

The suppressing of the side lobe of the original signal may include suppressing the side lobe of the original signal using a DBF result of the original signal and a DBF result of the virtual antenna signal.

The suppressing of the side lobe of the original signal may include forming a first DBF signal by performing DBF on the original signal, forming a second DBF signal by performing DBF on the virtual antenna signal, and suppressing the side lobe of the original signal by synthesizing the first DBF signal and the second DBF signal.

The suppressing of the side lobe of the original signal may include suppressing the side lobe of the original signal by multiplying the first DBF signal by the second DBF signal.

The suppressing of the side lobe of the original signal may include suppressing the side lobe of the original signal by multiplying the second DBF signal by a window coefficient for windowing processing and normalizing a multiplying result, and then multiplying the first DBF signal by a normalizing result.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
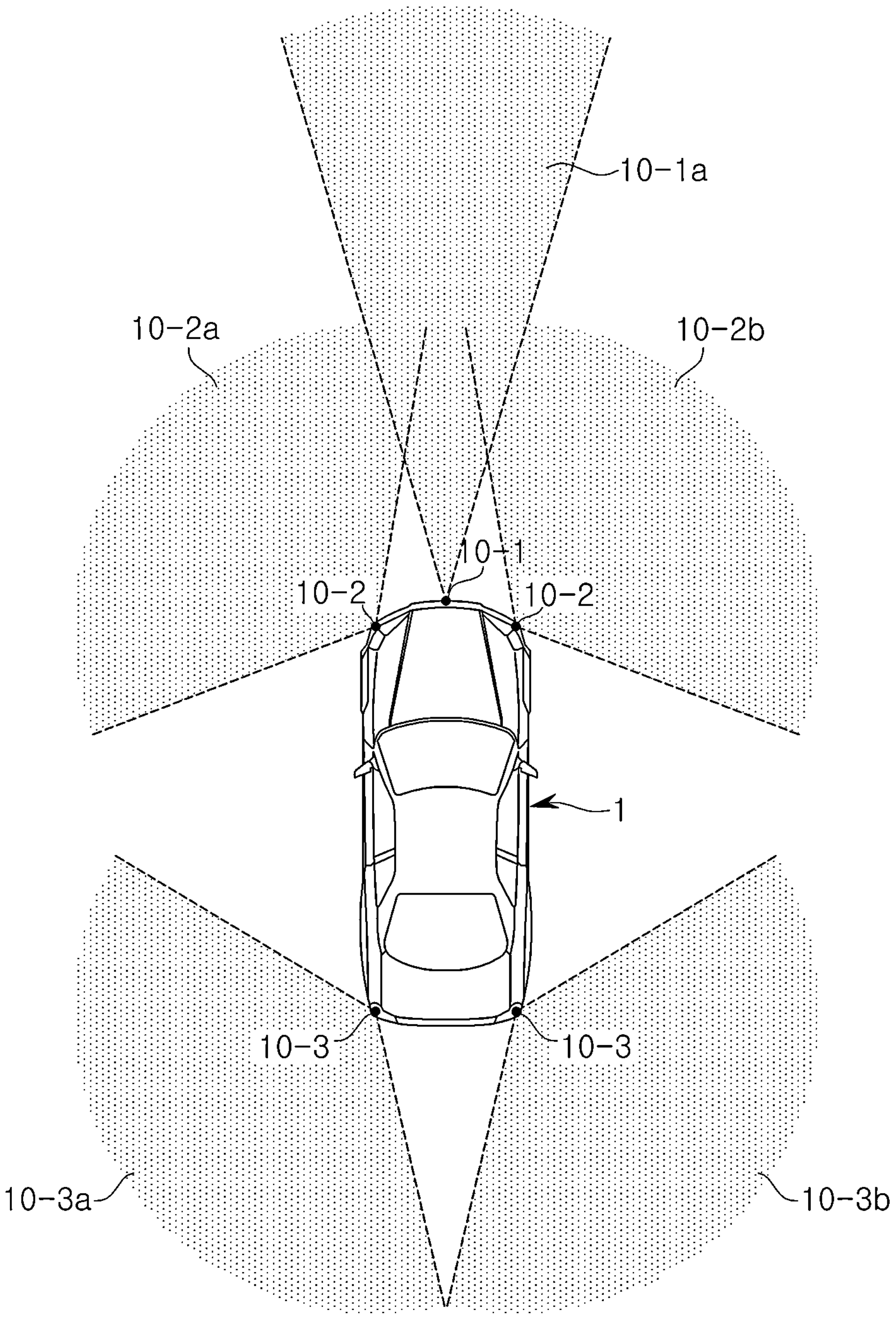
FIG. 1 is a configuration diagram in which a radar device according to one embodiment is mounted on a vehicle.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

FIG. 1 is a configuration diagram in which a radar device according to one embodiment is mounted on a vehicle.

Referring to FIG. 1, a radar device 10 may include at least one of a front radar 10-1 provided to have a forward field of sensing 10-1*a* of a vehicle 1, a first corner radar 10-2 provided to have forward left and right fields of sensing 10-2*a* and 10-2*b* thereof, and a second corner radar 10-3 provided to have rearward left and right fields of sensing 10-3*a* and 10-3*b* thereof.

The radar device 10 may detect distance information and velocity information of objects such as other vehicles, pedestrians, and cyclists positioned on at least one of a forward side, forward left and right sides, and rearward left and right sides of the vehicle 1.

The radar device 10 may detect and/or identify objects around the vehicle based on each radar signal and acquire distance information and velocity information according to positions of the objects.

Figure 2:
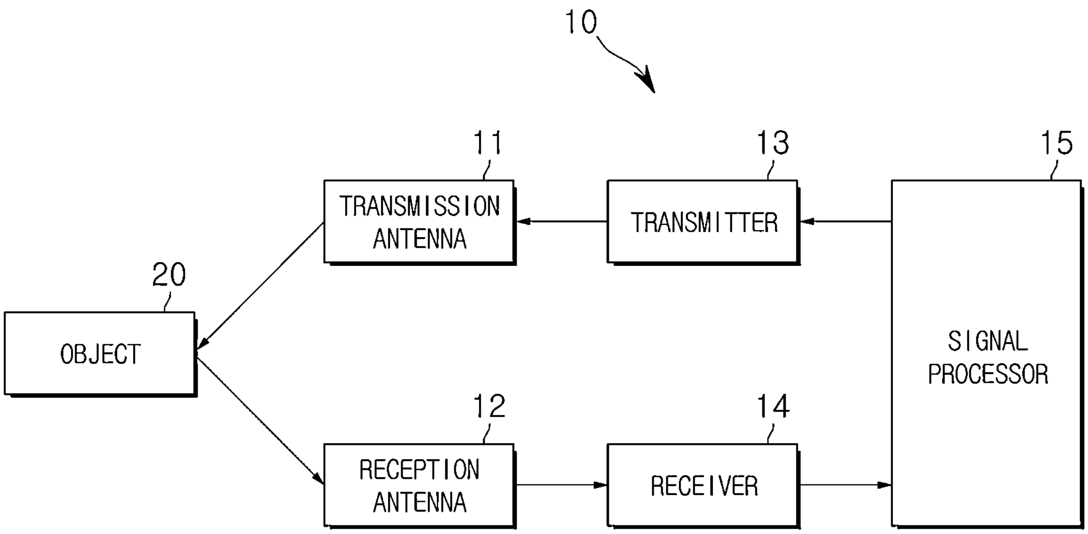
FIG. 2 is a control block diagram of the radar device according to one embodiment.

FIG. 2 is a control block diagram of the radar device according to one embodiment.

Referring to FIG. 2, the radar device 10 includes a transmission antenna 11, a reception antenna 12, a transmitter 13, a receiver 14, and a signal processor 15.

The transmission antenna 11 may include a plurality of transmission antennas.

The transmitter 13 transmits a preset transmission signal through the transmission antenna 11.

The transmitter 13 generates a continuous wave transmission signal to be transmitted to objects around the vehicle and transmits the generated continuous wave transmission signal through the transmission antenna 11.

The transmitter 13 may include a digital-to-analog converter (DAC) for converting a digital signal into an analog signal.

The reception antenna 12 uses an array antenna composed of a plurality of element antennas as a reception antenna. Reception signals received by each element antenna are transmitted to the signal processor 15.

The reception antenna 12 may include a reception antenna, which is a physical array antenna, and a virtual antenna, which is a virtual array reception antenna using a virtual array method.

The receiver 14 receives a reception signal in which the transmission signal is reflected from a target 20 and then returned through the reception antenna 12.

When the continuous wave transmission signal is reflected and then returned, the receiver 14 receives the returned continuous wave reflected signal.

The receiver 14 may include an analog-to-digital converter (ADC) for converting the received analog signal into a digital signal.

The signal processor 15 controls the transmitter 13 so that the transmitter 13 generates the transmission signal and transmits the generated transmission signal through the transmission antenna 11.

The signal processor 15 processes the reception signal received from the receiver 14.

For example, the concept of the signal processor 15 may include a micro controller unit (MCU) or a digital signal processor (DSP). The signal processor 15 may include one or more processors and a memory. The one or more processors may be integrated into one chip or may also be physically separated. In addition, the processor and the memory may also be implemented as a single chip. The memory may include both volatile memories such as a static random access memory (SRAM) and a dynamic RAM (DRAM) and non-volatile memories such as a flash memory, a read only memory (ROM), and an erasable programmable ROM (EPROM).

The signal processor 15 performs a virtual antenna generating function, a digital beam forming (DBF) function, and a side lobe suppressing function. The virtual antenna generating function is a function of generating a virtual antenna signal using an original signal, which is a digital reception signal received from the receiver 14. The DBF function is a function of forming a DBF signal of each of the original signal and the virtual antenna signal. The side lobe suppressing function is a function of suppressing a side lobe of the original signal using the DBF signal of the original signal and the DBF signal of the virtual antenna signal.

Figure 3:
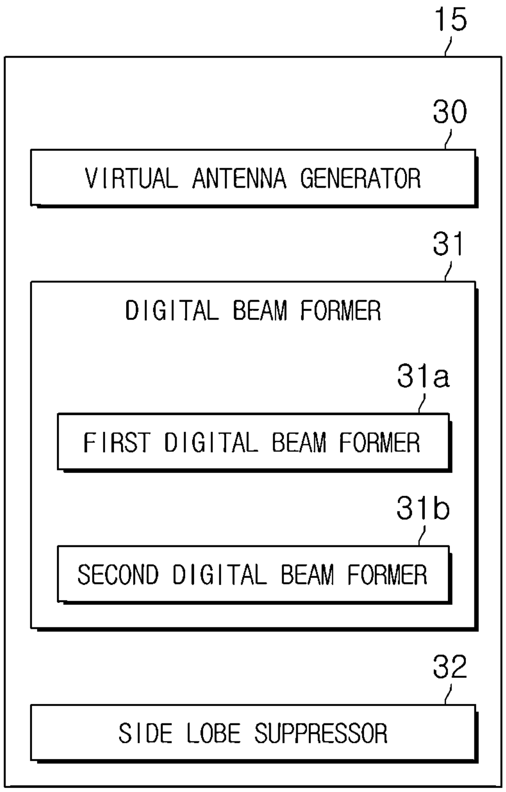
FIG. 3 is a detailed configuration diagram of a signal processor in FIG. 2.

FIG. 3 is a detailed configuration diagram of a signal processor in FIG. 2.

Referring to FIG. 3, the signal processor 15 may include a virtual antenna generator 30, a digital beam former 31, and a side lobe suppressor 32 to perform the virtual antenna generating function, the DBF function, and the side lobe suppressing function.

The virtual antenna generator 30 generates the virtual antenna signal using the original signal received from the receiver 14. When generating a virtual antenna, the virtual antenna generator 30 generates the virtual antenna signal in combinations of phase components of the reception signals received from the receiver 14.

Figures 4, 5:
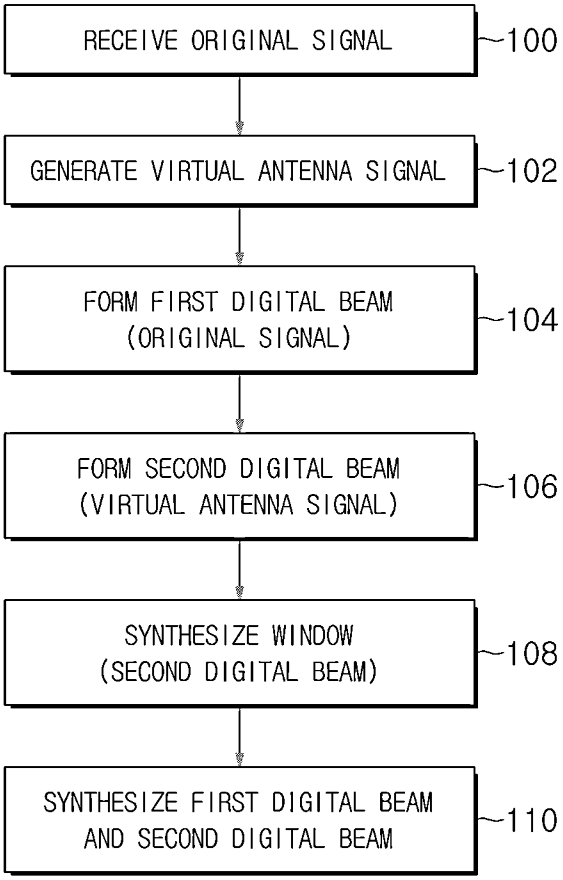
FIG. 4 is a view illustrating generating a virtual antenna signal in the radar device according to one embodiment.
FIG. 5 is a view illustrating a method of suppressing a side lobe in the radar device according to one embodiment.

FIG. 4 is a view illustrating generating a virtual antenna signal in the radar device according to one embodiment.

Referring to FIG. 4, the virtual antenna generator 30 may generate the virtual antenna signal as a preset equal interval signal.

An interval between a reception antenna Rx ANT and a virtual antenna Virtual ANT is illustrated in FIG. 4.

In the reception antenna, array intervals between internal element antennas may be equal or non-equal intervals. The non-equal intervals may be 1.5λ(0.0λ to 1.5λ), 1λ (1.5λ to 2.5λ), 2λ (2.5λ to 4.0λ), and the like.

In the virtual antenna, array intervals between internal element antennas may be equal intervals.

The array intervals between the element antennas in the virtual antenna are different from the array intervals between the element antennas in the reception antenna. For example, the virtual antenna may be virtually arranged to have smaller array intervals than the reception antenna.

At the time of generating the virtual antenna signal, it is advantageous to generate a signal at a preset interval, for example, at an equal interval of 0.5λ or less in order to minimize the side lobe of the original signal. However, since an angle error increases as depths D0, D1, and D2 of the virtual antenna increase, a designer may determine an application level.

Referring back to FIG. 3, the digital beam former 31 may include a first digital beam former 31*a* and a second digital beam former 31*b*.

The first digital beam former 31*a* forms a first DBF signal by performing DBF on the original signal received from the receiver 14.

The first digital beam former 31*a* forms the first DBF signal by applying phase modulation to the original signal received from the receiver 14 and amplifying a signal in a specific direction. For example, the first digital beam former 31*a* forms the first DBF signal by applying a beam forming coefficient to the original signal.

The second digital beam former 31*b* forms a second DBF signal by performing DBF on the virtual antenna signal generated by the virtual antenna generator 30.

The second digital beam former 31*b* forms the second DBF signal by applying phase modulation to the virtual antenna signal generated by the virtual antenna generator 30 and amplifying a signal in a specific direction. For example, the second digital beam former 30*b* forms the second DBF signal by applying a beam forming coefficient to the virtual antenna signal.

The side lobe suppressor 32 receives a DBF result of the original signal and a DBF result of the virtual antenna signal from the digital beam former 31.

The side lobe suppressor 32 suppresses the side lobe of the original signal using the DBF result of the original signal and the DBF result of the virtual antenna signal.

The side lobe suppressor 32 suppresses the side lobe of the original signal by synthesizing the DBF result of the virtual antenna signal and the DBF result of the original signal.

That is, the side lobe suppressor 32 receives the first DBF signal from the first digital beam former 31*a* and the second DBF signal from the second digital beam former 31*b*. The side lobe suppressor 32 suppresses the side lobe of the original signal by multiplying the first DBF signal, which is the DBF result of the original signal, by the second DBF signal, which is a reference signal.

The side lobe suppressor 32 may more effectively suppress the side lobe of the original signal by multiplying the second DBF signal by a window coefficient for windowing processing and normalizing the multiplying result in order to increase an attenuation rate of the signal at the time of synthesizing the DBF signals, and then multiplying the first DBF signal by the normalizing result.

FIG. 5 is a view illustrating a method of suppressing a side lobe in the radar device according to one embodiment.

Referring to FIG. 5, the signal processor 15 receives the reception signal, which is the original signal, from the receiver 14 (100). The reception antenna 12 uses the array antenna composed of the plurality of element antennas as the reception antenna, and the reception signals received by each element antenna are received by the receiver 14. The receiver 14 converts a received analog signal into a digital signal through the ADC and transmits the converted digital signal to the signal processor 15.

The signal processor 15 generates the virtual antenna signal using the original signal received from the receiver 14 (102). The signal processor 15 generates the virtual antenna signal in combinations of the phase components of the reception signals received from the receiver 14.

The signal processor 15 forms the first DBF signal, which is the DBF signal of the original signal, by performing DBF on the original signal received from the receiver 14 (104). The signal processor 15 forms the first DBF signal by applying the phase modulation to the original signal received from the receiver 14 and amplifying the signal in a specific direction.

The signal processor 15 forms the second DBF signal, which is the DBF signal of the virtual antenna signal, by performing DBF on the virtual antenna signal generated by the virtual antenna generator 30 (106). The signal processor 15 forms the second DBF signal by applying the phase modulation to the virtual antenna signal generated by the virtual antenna generator 30 and amplifying the signal in the specific direction.

The signal processor 15 synthesizes the second DBF signal and the window for windowing processing (108). The signal processor 15 may multiply the second DBF signal by the window coefficient for windowing processing and normalize a multiplying result in order to increase the attenuation rate of the synthesized signal to be described below.

The signal processor 15 synthesizes the first DBF signal and the second DBF signal in which the window has been synthesized (110). Therefore, it is possible to suppress the side lobe of the original signal by multiplying the first DBF signal by the second DBF signal in which the window has been synthesized. As described above, the signal processor 15 can more effectively suppress the side lobe of the original signal by multiplying the second DBF signal by the window coefficient for windowing processing and normalizing the multiplying result in order to increase the attenuation rate of the synthesized signal in which the DBF signals have been synthesized, and then multiplying the first DBF signal by the normalizing result.

Meanwhile, the signal processor 15 may synthesize the first DBF signal, which is the DBF signal of the original signal, and the second DBF signal, which is the DBF signal of the virtual antenna signal. The signal processor 15 can suppress the side lobe of the original signal by multiplying the first DBF signal, which is the DBF result of the original signal, by the second DBF signal, which is the DBF result of the virtual antenna signal.

Then, the signal processor 15 may detect a position and a velocity of a target based on the synthesized signal in which the side lobe has been suppressed.

Figure 6:
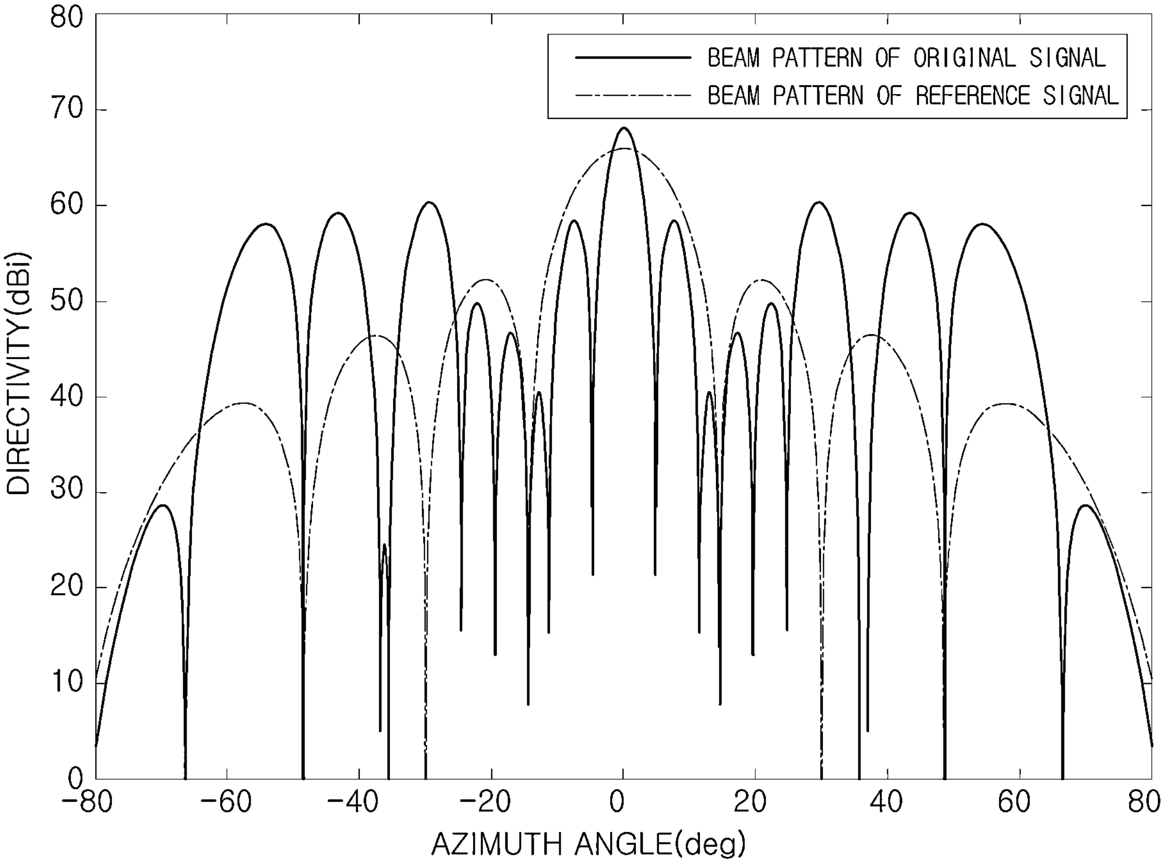
FIG. 6 is a graph illustrating a beam pattern of an original signal and a beam pattern of a reference signal, which have a directivity of 0 degrees, in the radar device according to one embodiment.
Figure 7:
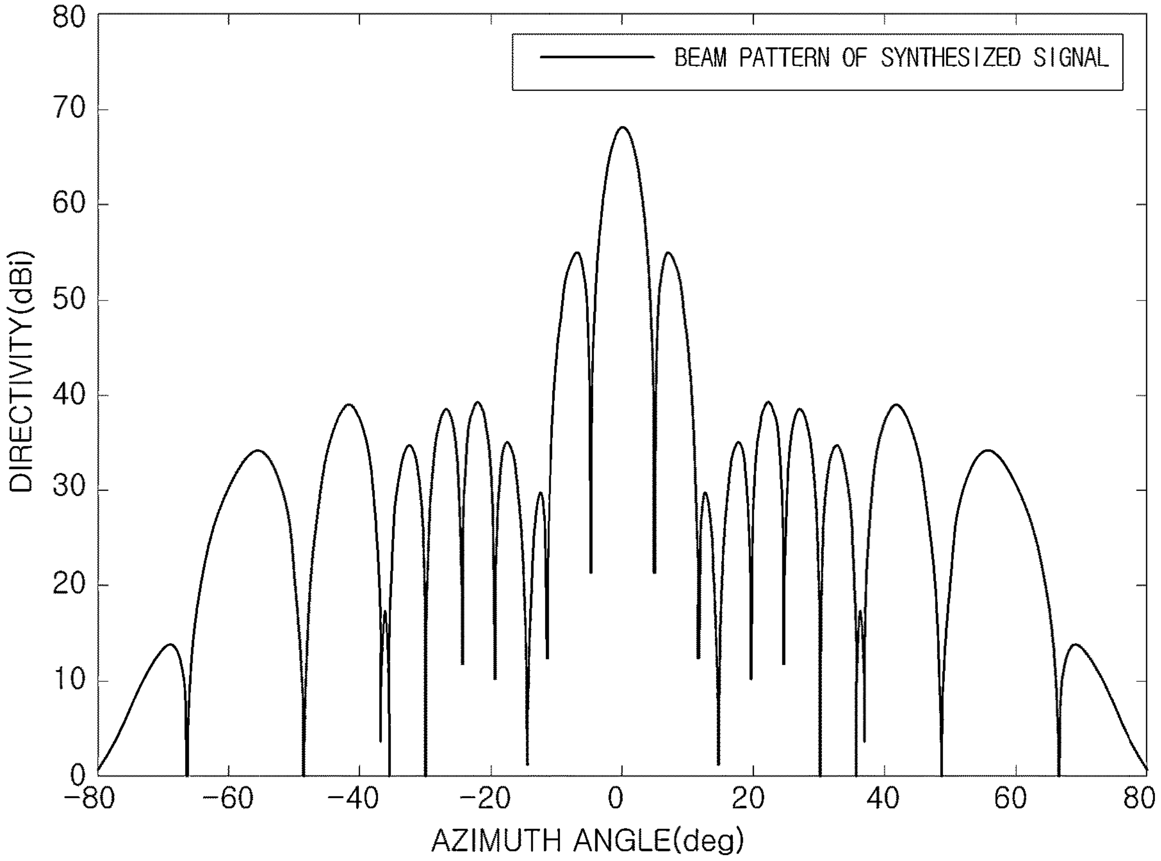
FIG. 7 is a graph illustrating a synthesized beam pattern synthesizing the beam pattern of the original signal and the beam pattern of the reference signal, which have a directivity of 0 degrees, in the radar device according to one embodiment.

FIG. 6 is a graph illustrating a beam pattern of an original signal and a beam pattern of a reference signal, which have a directivity of 0 degrees, in the radar device according to one embodiment, and FIG. 7 is a graph illustrating a synthesized beam pattern synthesizing the beam pattern of the original signal and the beam pattern of the reference signal, which have a directivity of 0 degrees, in the radar device according to one embodiment.

Referring to FIGS. 6 and 7, a beam pattern of the original signal directing 0 degrees, which is a DBF result of the original signal directing 0 degrees, a beam pattern of the reference signal directing 0 degrees, which is a DBF result of a virtual antenna signal directing 0 degrees, and a beam pattern of a synthesized signal directing 0 degrees are illustrated.

The beam pattern of the original signal directing 0 degrees is a beam pattern by the array intervals of the reception antenna illustrated in FIG. 4.

In the beam pattern of the original signal directing 0 degrees, it is illustrated that the main lobe is positioned at an azimuth angle of about 0 degrees and the side lobes are positioned in the remaining parts. It can be seen that a side lobe with a directivity value (dBi) (or a gain value) similar to that of the main lobe among the remaining parts is present. Ghost targets may be detected by these side lobes, thereby adversely affecting the driver assistance functions.

The beam pattern of the reference signal directing 0 degrees is a beam pattern by the array intervals of the virtual antenna illustrated in FIG. 4. The array intervals of the virtual antennas are different from the array intervals of the reception antennas and are preset at intervals, for example, equal intervals of 0.5λ or less in order to minimize the side lobe of the original signal.

In addition, the beam pattern of the reference signal directing 0 degrees is a result of multiplying the reference signal directing 0 degrees by the window coefficient for windowing processing and normalizing the multiplying result in order to increase the attenuation rate.

The beam pattern of the synthesized signal directing 0 degrees is a beam pattern of a signal synthesized by multiplying the beam pattern of the original signal directing 0 degrees by the beam pattern of the reference signal directing 0 degrees.

It can be seen that the side lobe of the original signal has been reduced in the beam pattern of the synthesized signal directing 0 degrees.

Figure 8:
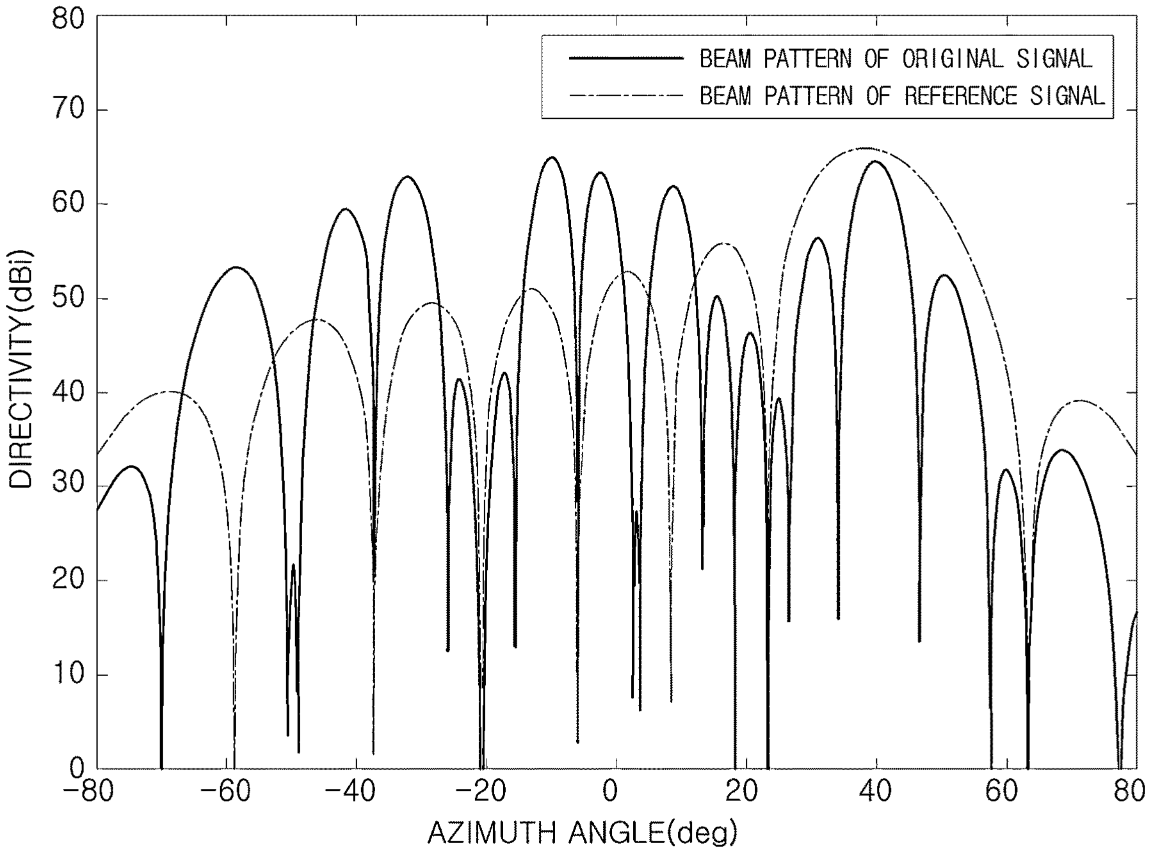
FIG. 8 is a graph illustrating a beam pattern of an original signal and a beam pattern of a reference signal, which have a directivity of 40 degrees, in the radar device according to one embodiment.
Figure 9:
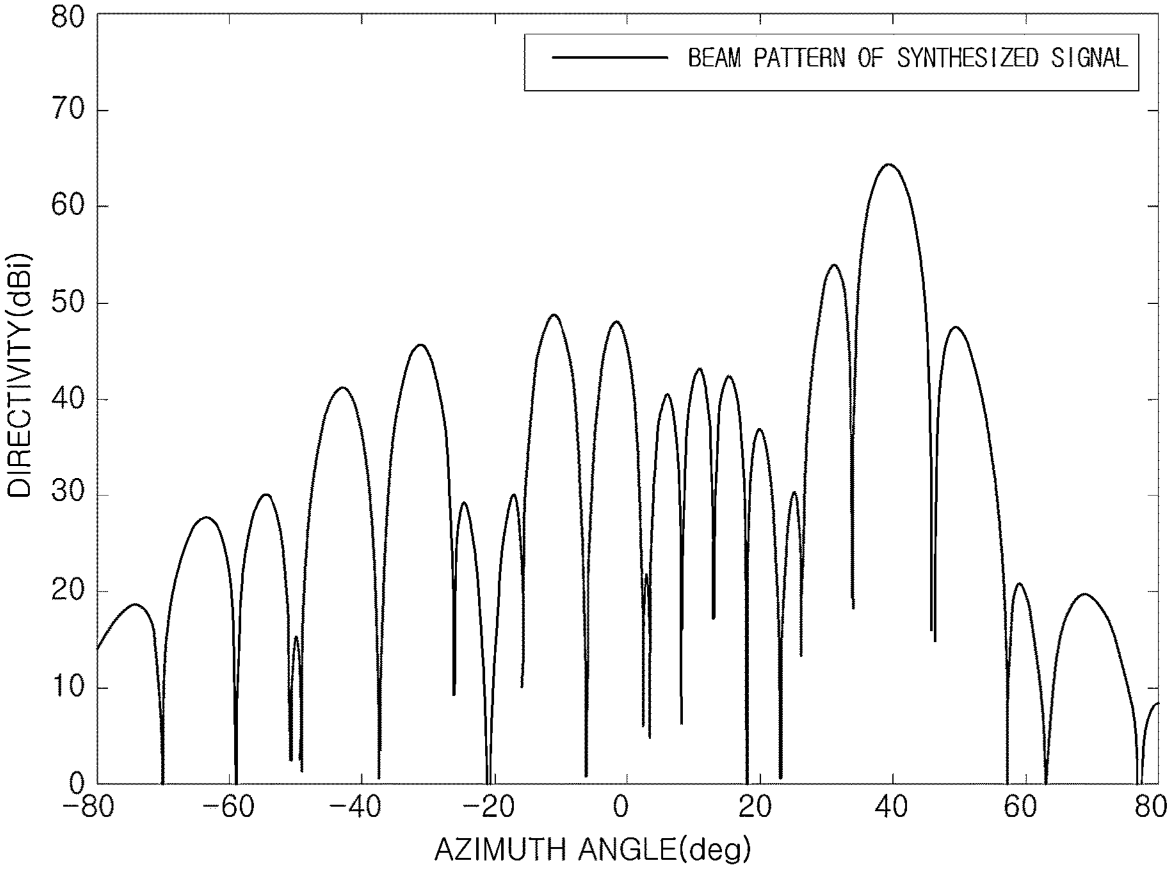
FIG. 9 is a graph illustrating a synthesized beam pattern synthesizing the beam pattern of the original signal and the beam pattern of the reference signal, which have a directivity of 40 degrees, in the radar device according to one embodiment.

FIG. 8 is a graph illustrating a beam pattern of an original signal and a beam pattern of a reference signal, which have a directivity of 40 degrees, in the radar device according to one embodiment, and FIG. 9 is a graph illustrating a synthesized beam pattern synthesizing the beam pattern of the original signal and the beam pattern of the reference signal, which have a directivity of 40 degrees, in the radar device according to one embodiment.

Referring to FIGS. 8 and 9, a beam pattern of the original signal directing deg, which is a DBF result of the original signal directing 40 degrees, a beam pattern of the reference signal directing 40 degrees, which is a DBF result of a virtual antenna signal directing 40 degrees, and a beam pattern of a synthesized signal directing 40 degrees are illustrated.

The beam pattern of the reference signal directing 40 degrees is a result of multiplying the reference signal directing 40 degrees by the window coefficient and normalizing the multiplying result in order to increase the attenuation rate.

The beam pattern of the synthesized signal directing 40 degrees is a beam pattern of a signal synthesized by multiplying the beam pattern of the original signal directing 40 degrees by the beam pattern of the reference signal directing 40 degrees.

In the beam pattern of the synthesized signal directing 40 degrees, it can be seen that the side lobe of the original signal has been reduced like the beam pattern of the synthesized signal directing 0 degrees.

As is apparent from the above description, it is possible to more effectively suppress a side lobe of an antenna beam pattern.

Exemplary embodiments of the present disclosure have been described above. In the exemplary embodiments described above, some components may be implemented as a “module”. Here, the term ‘module’ means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driver assistance, the apparatus comprising:
- a transmitter configured to transmit a signal through a transmission antenna;
- a receiver configured to receive a signal reflected from a target through a reception antenna and output the received signal as a digital signal; and
- a signal processor electrically connected to the transmitter and the receiver,
- wherein the signal processor is configured to:
- generate a virtual antenna signal in combinations of phase components of original signals received from the receiver;
- perform digital beam forming (DBF) on an original signal received from the receiver;
- perform the DBF on the virtual antenna signal; and
- suppress a side lobe of the original signal using a DBF result of the original signal and a DBF result of the virtual antenna signal.

2. The apparatus of claim 1, wherein the signal processor is configured to generate the virtual antenna signal based on a virtual antenna including internal element antennas which are equidistant each other.

3. The apparatus of claim 2, wherein the reception antenna is a physical reception including internal element antennas which are non-equidistant each other, and
- the virtual antenna is a virtual reception antenna including the internal element antennas which are equidistant each other.

4. The apparatus of claim 3, wherein array intervals of the internal element antennas of the virtual antenna are equal intervals of 0.5λ or less.

5. The apparatus of claim 1, wherein the signal processor comprises:
- a virtual antenna generator configured to generate the virtual antenna signal based on the original signal received from the receiver;
- a digital beam former configured to form a first DBF signal by performing DBF on the original signal received from the receiver and form a second DBF signal by performing DBF on the virtual antenna signal generated by the virtual antenna generator; and
- a side lobe suppressor configured to suppress the side lobe of the original signal by synthesizing the first DBF signal and the second DBF signal.

6. The apparatus of claim 5, wherein the digital beam former is configured to:
- form the first DBF signal by applying phase modulation to the original signal and amplifying a signal in a specific direction; and form the second DBF signal by applying phase modulation to the virtual antenna signal and amplifying a signal in a specific direction.

7. The apparatus of claim 5, wherein the side lobe suppressor is configured to suppress the side lobe of the original signal by multiplying the first DBF signal by the second DBF signal.

8. The apparatus of claim 5, wherein the side lobe suppressor is configured to suppress the side lobe of the original signal by multiplying the second DBF signal by a window coefficient for windowing processing and normalizing a multiplying result, and then multiplying the first DBF signal by a normalizing result.

9. An apparatus for driver assistance, the apparatus comprising:

a transmitter configured to transmit a signal through a transmission antenna;

a receiver configured to receive a signal reflected from a target through a reception antenna and output the received signal as a digital signal; and a signal processor electrically connected to the transmitter and the receiver, wherein the signal processor comprises:

a virtual antenna generator configured to generate a virtual antenna signal based on an original signal received from the receiver;

a digital beam former configured to form a first digital beam forming (DBF) signal by performing DBF on the original signal received from the receiver and form a second DBF signal by performing DBF on the virtual antenna signal generated by the virtual antenna generator; and a side lobe suppressor configured to suppress a side lobe of the original signal by synthesizing the first DBF signal and the second DBF signal.

10. The apparatus of claim 9, wherein the side lobe suppressor is configured to suppress the side lobe of the original signal by multiplying the second DBF signal by a window coefficient for windowing processing and normalizing a multiplying result, and then multiplying the first DBF signal by a normalizing result.

11. An apparatus for driver assistance, the apparatus comprising:

a transmitter configured to transmit a signal through a transmission antenna;

a receiver configured to receive a signal reflected from a target through a reception antenna and output the received signal as a digital signal; and a signal processor electrically connected to the transmitter and the receiver, wherein the signal processor comprises:

a virtual antenna generator configured to generate a virtual antenna signal based on an original signal received from the receiver;

a digital beam former configured to form a first digital beam forming (DBF) signal by performing DBF on the original signal received from the receiver and form a second DBF signal by performing DBF on the virtual antenna signal generated by the virtual antenna generator; and a side lobe suppressor configured to suppress a side lobe of the original signal by synthesizing the first DBF signal and the second DBF signal, wherein the side lobe suppressor is configured to:

suppress the side lobe of the original signal by multiplying the first DBF signal by the second DBF signal.

12. The apparatus of claim 11, wherein the side lobe suppressor is configured to suppress the side lobe of the original signal by multiplying the second DBF signal by a window coefficient for windowing processing and normalizing a multiplying result, and then multiplying the first DBF signal by a normalizing result.

* * * * *